United States Patent [19]

Kuwabara et al.

[11] Patent Number: 5,381,437
[45] Date of Patent: Jan. 10, 1995

[54] HIGH-POWER SOLID-STATE LASER RESONATOR

[75] Inventors: Kouji Kuwabara, Hitachi; Makoto Yano, Mito; Kiwamu Takehisa, Hitachi, all of Japan

[73] Assignee: Hitachi, Ltd., Tokyo, Japan

[21] Appl. No.: 92,914

[22] Filed: Jul. 19, 1993

[30] Foreign Application Priority Data

Jul. 20, 1992 [JP] Japan .................. 4-191875

[51] Int. Cl.$^6$ ............................ H01S 3/10
[52] U.S. Cl. ........................ 372/98; 372/106
[58] Field of Search .......... 372/92, 98, 105, 106, 372/108

[56] References Cited

U.S. PATENT DOCUMENTS

| | | | |
|---|---|---|---|
| 3,657,510 | 4/1972 | Rothrock | 219/121.11 |
| 3,798,571 | 3/1974 | Segre | 372/33 |
| 3,824,492 | 7/1974 | Brienza et al. | 372/105 X |
| 4,068,190 | 1/1978 | Ferguson | 372/105 X |
| 4,408,334 | 10/1983 | Lundstrom | 372/98 |
| 4,498,179 | 2/1985 | Wayne et al. | 372/106 X |
| 4,547,651 | 10/1985 | Maruyama | 372/106 X |
| 4,935,932 | 6/1990 | Johnson et al. | 372/33 |
| 5,119,383 | 6/1992 | Duling, III et al. | 372/106 X |
| 5,142,548 | 8/1992 | Krasinski et al. | 372/105 |
| 5,175,736 | 12/1992 | Woodward et al. | 372/106 X |

OTHER PUBLICATIONS

Scott et al., "Birefringence Compensation and TEM$_{oo}$ Mode Enhancement in a Nd:YAG Laser", Applied Physics Letters, vol. 18, No. 1, Jan. 1971, pp. 3–4.

*Primary Examiner*—John D. Lee
*Attorney, Agent, or Firm*—Antonelli, Terry, Stout & Kraus

[57] ABSTRACT

There is disclosed a solid-state laser resonator capable of outputting a high power linearly polarized laser beam, in which a laser beam subjected to the birefringence in the laser resonator is effected to minimize a component of the laser beam which is orthogonal with the direction of polarization definable by a Brewster plate upon traversing a quarter-wave plate, to enable the linear polarization output distribution of the laser beam to become uniform. With this, the emission efficiency and the output power of a linearly polarized laser beam are much improved.

16 Claims, 4 Drawing Sheets

5,381,437

HIGH-POWER SOLID-STATE LASER RESONATOR

BACKGROUND OF THE INVENTION

1. Field of the Invention

The present invention relates to a solid-state laser apparatus and, more particularly, to a high power solid-state laser resonator which is capable of emitting a high-power linearly polarized laser beam.

2. Description of Related Art

In order to output a linearly polarized laser beam from a solid-state laser resonator such as a YAG laser resonator, for example, it is a typical practice to insert an optical device represented by such as a Brewster plate which characterizes a direction of polarization thereof. According to this method, however, it is difficult to output a high-power linearly polarized laser beam due to a birefringence caused by the thermal stress occurring in the laser rod.

As a method for solving such a problem, an arrangement including a quartz polarization rotator which is capable of rotating the polarizing direction by 90 degrees and which is disposed between two laser rods is disclosed in (1) APPLIED PHYSICS LETTERS (Vol. 18, No. 1, pp.3-4, January 1971). According to this scheme, the influence effected from the birefringence induced in one laser rod is canceled out by the induced birefringence associated with the other laser rod. To this end, it is prerequisite that a laser beam be such as to traverse substantially the same portions in both laser rods, and that substantially the same thermal loadings to be applied to both the laser rods.

According to the experiments conducted by the inventors, however, it was found very difficult in practice to successfully arrange equipment for these two prerequisite conditions to be satisfied concurrently. Thus it was found impossible to fully cancel out the influences caused by the effect of the birefringence. As a result, therefore with an increasing thermal loading applied to the laser rod, the output of a linearly polarized laser beam decreased thereby resulting in a non-uniform intensity distribution thereof.

Further, another arrangement for solving the problem is proposed in (2) U.S. Pat. No. 4,935,932 in which a polarization plate and a quarter-wave plate are disposed at both ends of a laser rod, respectively, whereby the polarizer and the quarter-wave plate are disposed such that an incident light beam impinging on the laser rod becomes elliptically polarized or, more preferably, to become circularly polarized.

In the arrangement of (2), it was found that the output of a linearly polarized laser beam decreased with an increasing thermal loading of the laser rod. This phenomenon is presumed to be due to a so-called thermal loading birefringence effect induced in the resonator which allows for the laser beam generated within the resonator to have a component polarized in a different direction from the polarized direction determined by a Brewster plate or the like.

When a birefringence phenomenon takes place, a linearly polarized laser beam having a cross-shaped intensity distribution as shown in accompanying FIG. 15, referred to as the cross mode, is emitted from the laser resonator. An arrow P in FIG. 15 designates the directions of polarization to be characterized by a Brewster inserted therein.

Portions designated by symbol Br in FIG. 15 are regions where a laser beam, subjected to the birefringence phenomenon, has an orthogonal component relative to the direction of polarization to be characterized by a Brewster plate which becomes dominant. Thereby, the overall efficiency of the linearly polarized laser beam is degraded, thus resulting in a significantly reduced output power.

SUMMARY OF THE INVENTION

An object of the present invention is to solve the foregoing problems associated with the prior art and to provide a solid-state laser resonator which can substantially improve its laser beam efficiency, thereby ensuring a linearly polarized higher output power to be emitted therefrom.

A feature of the invention resides in providing a solid-state laser apparatus comprising:

a laser resonator having a solid-state laser medium, a total reflection mirror disposed on one side of the laser medium and an output mirror disposed on the opposite side of the total reflection mirror with respect to the laser medium; the laser medium generating a laser beam with a particular direction of polarization; and at least one phase plate (e.g., a quarter-wave plate) located in an optical path of the laser beam; an optical axis of a crystal of said phase plate being substantially parallel with the particular direction of polarization.

According to the invention, a laser beam subjected to the birefringence phenomenon in the laser resonator, upon traversing a quarter-wave plate, reduces its component in a direction orthogonal with the direction of polarization of the laser beam to be defined therein, thereby the linearly polarized output distribution of the laser beam becomes homogeneous, whereby the efficiency thereof is substantially improved and, consequently a linearly polarized higher output power of laser beam is obtained.

These and other objects of the invention will be seen by reference to the description, taken in connection with the accompanying drawings.

DESCRIPTION OF THE PREFERRED EMBODIMENTS

Figure 1:
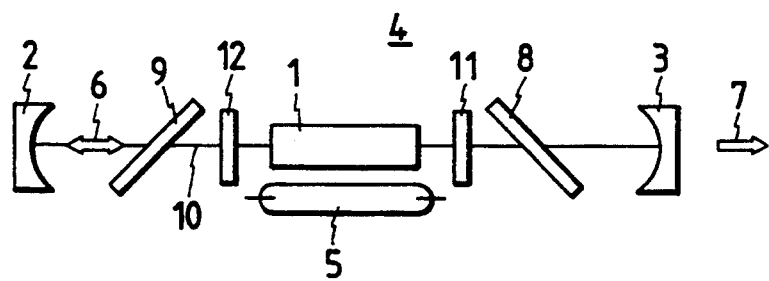
FIG. 1 is a side view of a schematic YAG laser resonator of one embodiment of the invention.

One preferred embodiment of the invention will be set forth in the following by way of example of a YAG laser as shown in FIG. 1.

With reference to FIG. 1, numeral 1 is a YAG rod which contains Nd ion of about 1%, which in combination with a total reflection mirror 2 and an output mirror 3 constitutes a laser resonator 4. A laser beam 6 is generated in the YAG rod 1 by light excitation by means of an excitation lamp 5, and a portion of the laser beam 6 is emitted out of a resonator 4 as a laser beam 7. In order to characterize or define a direction of polarization within the resonator 4, Brewster plates 8, 9 are disposed in the optical path of the laser beam 6, whereby in FIG. 1, the direction of polarization of the laser beam 6 is effected to become parallel with the plane of the paper. Numerals 11 and 12 designate quarter-wave plates, each of which is disposed such that the direction of an optical axis of the crystal thereof becomes substantially parallel with the direction of polarization of the laser beam 6 to be characterized by the Brewster plates 8, 9.

Next, the operation of the laser oscillator according to this embodiment will be described in the following.

Upon light excitation in the YAG rod 1 by means of the excitation lamp, laser oscillation is started. Although the polarizing direction of the laser beam 6 while passing through the Brewster plates 8, 9 is effected to become parallel with the plane of the paper, with an increasing temperature in the YAG rod 1, however, a birefringence phenomenon due to the thermal stress is caused to take place therein.

Figure 2:
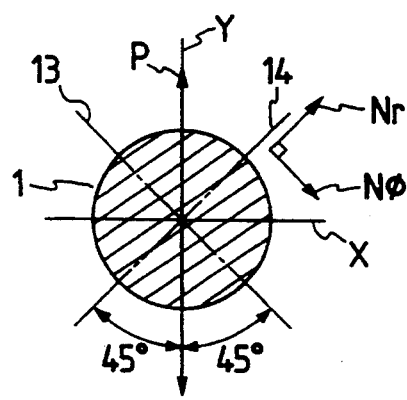
FIG. 2 is a cross-sectional view of a YAG rod illustrating the polarization state thereof which is utilized in FIG. 1.

As a result of the loading of the thermal stress, a relationship between an index of refraction ($n_r$) in the radial direction and an index of refraction ($n\Phi$) in the tangential direction, as shown in FIG. 2, becomes $n_r < n\Phi$, thereby the phase of a laser beam having its polarization plane in the tangential direction advances from the phase of a laser beam having its polarization plane in the radial direction. The Y axial direction in FIG. 2 coincides with a direction parallel to the plane of the paper in FIG. 1, and the X axial direction coincides with a direction perpendicular to the plane of the paper thereof.

An influence resulting from a difference between these two directions becomes maximum on lines 13, 14 which make ±45 degrees with respect to the polarization direction of the laser beam 6 shown by P in FIG. 2.

FIGS. 3 through 9 indicate how the polarization states of a linearly polarized laser beam change while it passes through the line 13 in the direction perpendicular to the plane of the paper as it makes one round trip traversing the YAG rod 1.

Figure 3:
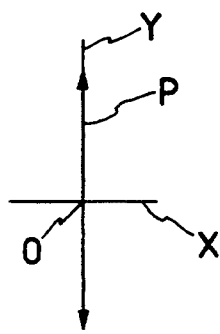
FIG. 3 illustrates a polarization state of the laser beam prior to impinging on a quarter-wave plate 11 in the YAG laser resonator of FIG. 1.
Figure 4:
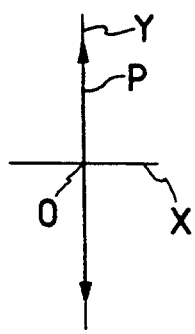
FIG. 4 illustrates a polarization state of the laser beam after passing through the quarter-wave plate 11 in the YAG laser resonator of FIG. 1.
Figure 5:
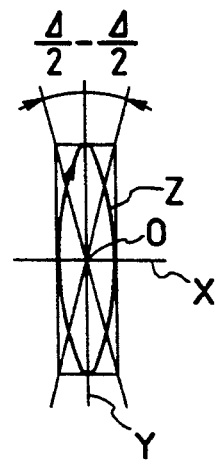
FIG. 5 illustrates a polarization state of the laser beam after traversing the YAG rod 1 of FIG. 1 in its forward path.

A polarization state of a laser beam 6 immediately prior to its incidence on the quarter-wave plate 11 is shown in FIG. 3. That of the laser beam after passing through the quarter-wave plate becomes linearly polarized as shown in FIG. 4, and further, it becomes elliptically polarized as shown by Z in FIG. 5 upon passing through the YAG rod 1 in its forward path.

Figure 6:
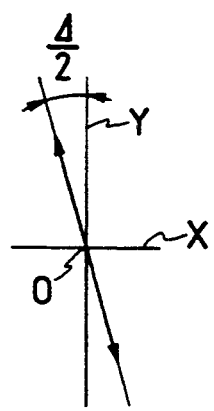
FIG. 6 illustrates a polarization state of the laser beam after traversing the quarter-wave plate 12 of FIG. 1 in its forward path.
Figure 7:
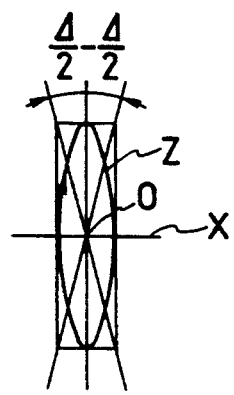
FIG. 7 illustrates a polarization state of the laser beam after retraversing the quarter-wave plate in its return path.
Figure 8:
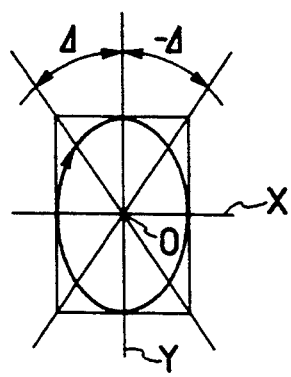
FIG. 8 illustrates a polarization state of the laser beam after tetraversing the YAG rod 1 in its return path.
Figure 9:
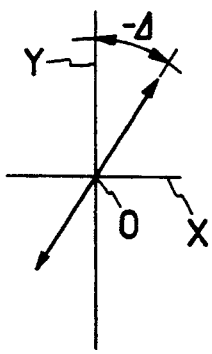
FIG. 9 illustrates a polarization state of the laser beam after tetraversing the quarter-wave plate 11 in its return path.

Upon transmission through the quarter-wave plate 12, the laser beam is linearly polarized as shown in FIG. 6. It then is reflected by the total reflection mirror 2 so as to pass through once again the quarter-wave plate 12 which thereby becomes elliptically polarized right-handedly as shown by Z in FIG. 7. Upon retraversing the YAG rod 1 in its return path, the laser beam is further elliptically polarized as shown in FIG. 8, then while retraversing the quarter-wave plate 11, the beam becomes linearly polarized as shown in FIG. 9.

As described hereinabove, the linearly polarized incident laser beam is polarized to have a right-handed elliptical polarization while traversing the YAG rod 1 in its forward path, where $\Delta$ is a phase difference in radian caused by traversing the lasing rod 1. Reflected by the total reflection mirror 2, and through retraversing the YAG rod 1 in its return path, the laser beam is elliptically polarized in the right hand with a different tilt angle, then upon tetraversing the quarter-wave plate 11, it becomes a linearly polarized beam with an azimuth angle of $-\Delta$.

Therefore, an azimuth angle of a laser beam which has traveled one round trip within the resonator becomes $\Delta$. When $\Delta = \pm n\pi/2$, it coincides with the direction of polarization of an incident laser beam the direction of which is shown in FIG. 3 by P. Then, when $\Delta = \pm(n+1)\pi/2$, it orthogonally intersects with the direction of polarization of the incident laser beam the direction of which is shown in FIG. 3 by P, where, $n = 0, 2, 4, 6 \ldots$ Depending on a value of the phase difference $\Delta$ resulting from the transmission through the YAG rod, a difference arises in the effects to be brought about by insertion of the quarter-wave plates 11, 12.

Figure 10:
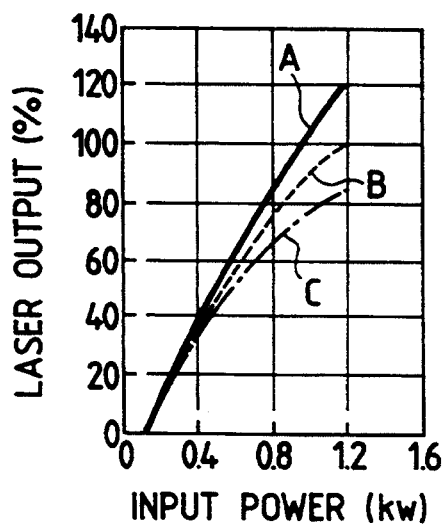
FIG. 10 shows an example of oscillation characteristics of a YAG laser resonator pertaining to the invention.
Figure 15:
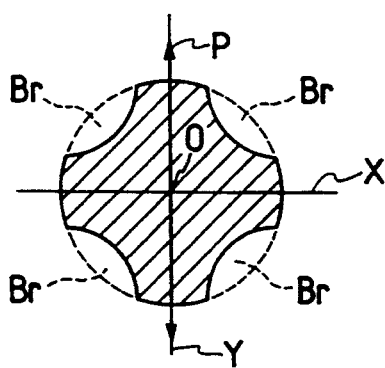
FIG. 15 is a cross section view of a typical laser beam output in order to explain the birefringence thereof.

However, according to the inventors' experiment the result of which is shown in FIG. 10 utilizing the arrangement of FIG. 1 where a YAG rod of 10 mm in diameter and 152 mm in length was utilized, a laser output A obtained with an input power of 1.2 kW according to the embodiment of the invention was observed to increase approximately by 20% in comparison with a prior art laser output B. Although it was anticipated at first, in particular, for the intensity distribution of an emitted laser beam to become nonuniform as shown in FIG. 15 in consideration of the result of the foregoing discussions, the cross-mode polarization obtained in the experiment prior to insertion of the quarter-wave plate has unexpectedly changed to a circular mode having substantially a uniform intensity distribution as shown in FIG. 2. This has been presumed to be due to that FIGS. 3 through 9 dealt only with the results of discussions on limited cases involving a linearly polarized laser beam having a particular direction of polarization and making one round trip, which in consequence suggests existence of some other laser beams having other directions of polarization in the resonator capable of serving advantageously to the object of the invention. Further, with reference to FIG. 10, a laser output C designates a property obtained by the arrangement according to U.S. Pat. No. 4,935,932 in comparison with the output A of the present invention. As clearly seen, the latter output is lower by about 30% than the former.

This difference in the output is judged to result from the fact that whereas according to the present embodiment the quarter-wave plate and Brewster plate are disposed such that an incident beam entering a laser rod becomes linearly polarized, a quarter-wave plate and a polarization plate according to U.S. Pat. No. 4,935,932 are disposed such that an incident laser beam entering a laser rod becomes elliptically polarized or circularly polarized, thereby causing the difference in the states of polarization of laser beams entering laser rod, thus adversely affecting the output.

According to the embodiment as set forth hereinabove, the laser beam having been subjected to the birefringence in the laser resonator, upon transmission through the quarter-wave plate, is effected to minimize a component in its laser beam which intersects orthogonally with a polarization direction to be defined by the Brewster plate, and thus enables the linearly polarized output distribution of the laser beam to be distributed uniformly, with an improved efficiency such that the overall laser beam output can be increased approximately by 20% in terms of the linearly polarized output in comparison with a case without the use of the quarter-wave plate.

Figure 11:
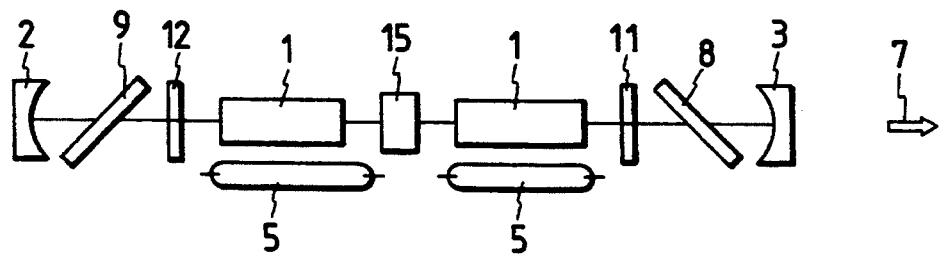
FIG. 11 is a side view of a YAG laser resonator of another embodiment of the invention.

FIG. 11 shows another preferred embodiment of the invention in which a quartz polarization rotator 15 for rotating the direction of polarization by 90 degrees is interposed between two YAG rods 1. Such an arrangement of a laser resonator including the two YAG rods 1 and the quartz polarization rotator 15 is known as an effective method for canceling out birefringence influences generated in both the YAG rods.

According to the results of the experiments conducted by the present inventors, however, it was found very difficult to ensure a precise alignment to be made between the two YAG rods 1. In addition, when a thermal loading in the YAG rods 1 increases significantly, the influences of birefringence in the respective YAG rods could not have been canceled out. Therefore, with respect to the foregoing configuration, according to this embodiment, a direction of polarization definable by the Brewster plate 8 and a direction of an optic axis of crystal of the quarter-wave plate 11 are made essentially in parallel with each other, and a direction of polarization definable by the Brewster plate 9 and a direction of an optical axis of crystal of the quarter-wave plate 12 become essentially parallel with each other. These two polarization directions are rendered to hold a relationship such that they intersect orthogonally to each other via the quartz polarization rotator 15 interposed therebetween. Since this embodiment of the invention operates to compensate for the influences of birefringence in the two YAG rods 1 by means of the quarter-wave plates 9, 11, which could not have been canceled out even by insertion of the quartz polarization rotator 15, a substantial effect can be obtained by insertion of a quarter-wave plate even for a higher input power than that available by the arrangement of FIG. 1. In an experiment utilizing two YAG sods of 10 mm in diameter and 152 mm in length, the laser output increased by 20% for 2.4 kW of an input power in comparison with the prior art, and; moreover, the intensity distribution of the emission laser beam changed unexpectedly from the cross-mode to a circular-mode having approximately a uniform intensity distribution with no cost of decreased intensity which has been inevitable in the prior art.

Figure 12:
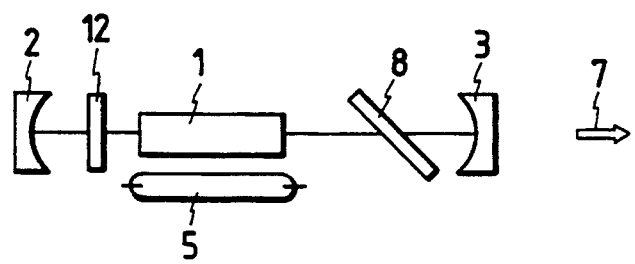
FIG. 12 is a side view of a YAG laser resonator of still another embodiment of the invention.

FIG. 12 illustrates still another embodiment of the invention in which the quarter-wave plate 12 is disposed between the YAG rod 1 and total reflection mirror 2, and the Brewsteer plate 8 between the YAG rod 1 and the output mirror 3. Although the same effect cannot be obtained according to this embodiment of the invention for particularly high-power inputs as exhibited in the foregoing two embodiments of the invention, it is confirmed that a substantial effect is obtainable in the level of a 0.7 kW input power.

According to this embodiment of the invention, since the quarter-wave plate 11 and the Brewster plate 9 were eliminated, equipment can be made compacter accordingly. Further, it was confirmed that with this embodiment of the invention significant change occurred in the effect obtainable even by placing the quarter-wave plate 12 between the YAG rod 1 and the Brewster plate 8.

Figure 13:
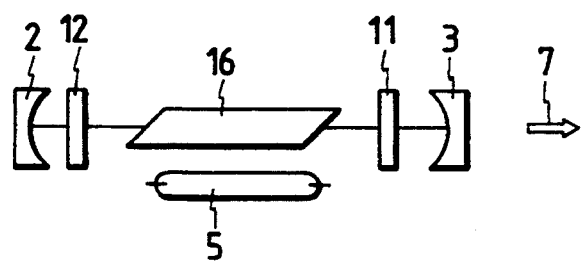
FIG. 13 is a side view of a YAG laser resonator of further another embodiment of the invention.

FIG. 13 shows a further embodiment of the invention as applied to a slab type YAG laser, where since the direction of polarization is definable by the YAG slab itself (in the plane of the paper in FIG. 13), the quarter-wave plate 12 is inserted in such a manner that the direction of an optical axis of crystal of a quarter-wave plate becomes approximately parallel with the direction of the polarization. In this arrangement, no Brewster plate is needed. Typically, in a slab type lasing medium, its linearly polarized laser output characteristic varies depending on its adiabatic performance at both ends in cross direction thereof. However, by adopting the arrangement of this embodiment, a linearly polarized laser at a higher input power can be prevented from decreasing its output power resultant of a temperature gradient at both ends in cross direction. Further, this configuration can be adapted also to have only one of the quarter-wave plates 11 and 12.

Further, with respect to the foregoing four embodiments of the invention, they have been described referring to such particular cases where quarter-wave plates having only one optical axial direction are utilized. However, there is also known the use of such an equivalent quarter-wave plate which has been prepared by laminating two quartz plates in such a manner that their respective optical axial directions intersect orthogonally, and as having a thickness equivalent to a difference between the two quartz plates laminated. When utilizing this type of a quarter-wave plate, it may be inserted in the optical path in such a manner that either one of the optic axial directions thereof becomes approximately parallel with the direction of polarization to be defined by the Brewster plate.

Figure 14:
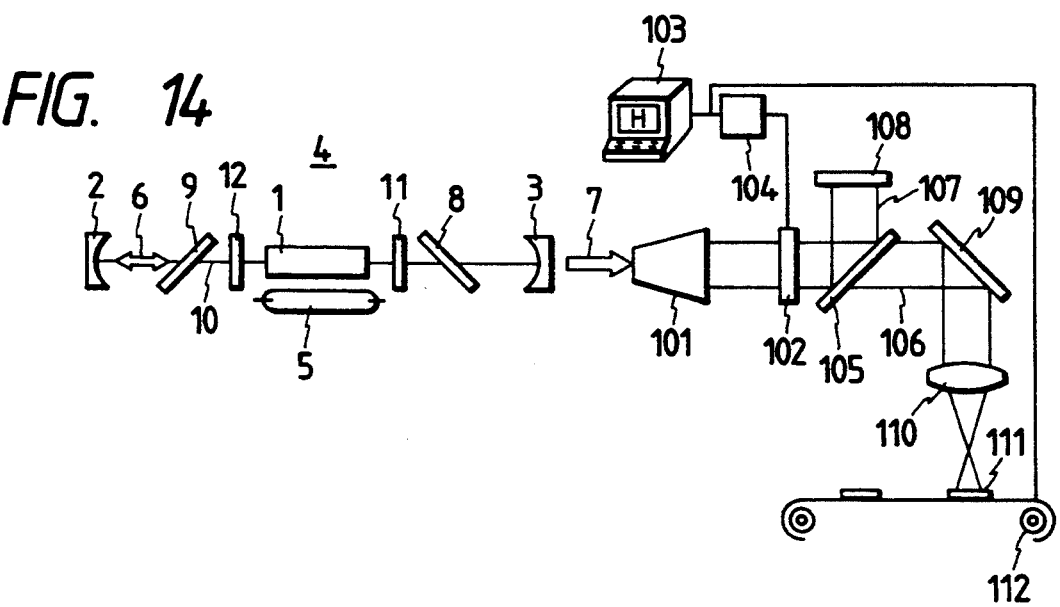
FIG. 14 illustrates a YAG laser resonator of another embodiment of the invention as applied to a laser marker.

With reference to FIG. 14, there is disclosed a laser oscillator 4, according to the invention, which is applied to a trimming apparatus for use in resistance trimming of resistor films mounted on semiconductor devices. In this figure, a laser beam 7 from a laser oscillator 4 is exposed onto a liquid crystal mask 102 via a beam expander 101. On the liquid crystal mask 102, pattern information to be marked on a work piece is displayed, which is transmitted from a laser marker controller 103 through a liquid crystal drive unit 104. Then, a laser beam 106 which reflects the pattern information is separated by a polarizing beam splitter 105 in order to transcribe the pattern onto a work piece 111 via a mirror 109 and through a lens 110. An unnecessary beam 107 is absorbed in an absorber plate 108. A movable work stage 112 is controlled by the laser marker controller 103.

Further, a laser beam machine utilizing the laser oscillator 4 according to the invention exhibits a significant advantage when applied to the surface treatment, but not limited thereto, and can be applied to cutting and the like as well.

We claim:

1. A solid-state laser apparatus comprising:
   a laser resonator comprised of a solid-state laser medium, a total reflection mirror disposed on a first of two, opposing sides of said laser medium and an output mirror disposed oppositely said total reflection mirror, on the second side of said laser medium, wherein said laser medium is disposed to generate a laser beam with a particular direction of polarization; and
   at least one quarter-wave plate located in an optical path of said laser beam, wherein said quarter-wave plate is disposed to have an optical axis substantially parallel with the particular direction of polarization of said laser beam.

2. A solid-state laser apparatus according to claim 1, wherein said laser resonator further comprises:
   a laser rod constituting said laser medium; and
   at least one Brewster plate for defining the particular direction of polarization of said laser beam.

3. A solid-state laser apparatus according to claim 2, wherein said laser rod is disposed between a respective one of said at least one Brewster plate and a respective one of said at least one quarter-wave plate.

4. A solid-state laser apparatus according to claim 2, wherein said at least one quarter-wave plate and said at least one Brewster plate are disposed in an arrangement including a quarter-wave plate and a Brewster plate at one or both of two, opposing ends of said laser rod.

5. A solid-state laser apparatus according to claim 2, wherein said at least one quarter-waver plate and said at least one Brewster plate consist of a single quarter-wave plate and a single Brewster plate, respectively, said quarter-wave plate being disposed between a first of two, opposing ends of said laser rod and said total reflection mirror, and said Brewster plate being disposed between the second end of said laser rod and said output mirror.

6. A solid-state laser apparatus according to claim 2, wherein said at least one quarter-wave plate and said at least one Brewster plate are disposed in an arrangement including a quarter-wave plate and a Brewster plate provided between a first of two, opposing ends of said laser rod and said total reflection mirror and provided between the second end of said laser rod and said output mirror.

7. A solid-state laser apparatus according to claim 6, wherein each said quarter-wave plate is disposed between a respective said Brewster plate and a corresponding end of said laser rod.

8. A solid-state laser apparatus according to claim 1, wherein said laser medium comprises a laser slab which is disposed to define the particular direction of polarization of a laser beam.

9. A solid-state laser apparatus according to claim 8, wherein said at least one quarter-wave plate includes a quarter-wave plate disposed at either of two, opposing ends of said laser slab.

10. A solid-state laser apparatus according to claim 8, wherein said at least one quarter-wave plate includes a pair of quarter-wave plates, a first of which is dispsoed between said laser slab and said total reflection mirror and the second of which is disposed between said laser slab and said output mirror.

11. A solid-state laser apparatus comprising:
    a laser resonator comprised of a solid-state laser medium including two laser rods, a total reflection mirror disposed on a first of two, opposing sides of the laser medium, an output mirror disposed oppositely said total reflection mirror, on the second side of said laser medium, and a quartz polarization rotator disposed between said two laser rods, wherein said laser medium is disposed so as to generate a laser beam with a particular direction of polarization; and
    at least one quarter-wave .plate located in an optical path of said laser beam, wherein said quarter-wave plate is disposed to have an optical axis substantially parallel with the particular direction of polarization of said laser beam.

12. A solid-state laser according to claim 11, wherein said laser resonator further comprises:
    at least one Brewster plate for defining the particular direction of polarization of said laser beam.

13. A solid-state laser apparatus according to claim 12, wherein said at least one quarter-wave plate and said at least one Brewster plate are disposed in an arrangement including a quarter-wave plate and a Brewster plate at one or both of the two, opposing ends of said laser medium.

14. A solid-state laser apparatus according to claim 12, wherein said at least one quarter-wave plate and said at least one Brewster plate are disposed in an arrangement including a quarter-wave plate and a Brewster plate provided between the first side of said laser medium and said total reflection mirror and provided between the second side of said laser medium and said output mirror.

15. A solid-state laser apparatus according to claim 14, wherein each said quarter-wave plate is disposed between a respective said Brewster plate and a corresponding side of said laser medium.

16. A solid-state laser apparatus according to claim 15, wherein said two laser rods of said laser medium are disposed so as to be longitudinally axially aligned with each other.

* * * * *